United States Patent [19]
Zeien et al.

[11] Patent Number: 5,349,979
[45] Date of Patent: Sep. 27, 1994

[54] LINE TAPPING AND CLAMPING ASSEMBLY FOR REFRIGERATION SYSTEMS

[75] Inventors: Terri Zeien; Richard Rahn, both of Lakeville, Minn.

[73] Assignee: Instant Pierce, Inc., Lakeville, Minn.

[21] Appl. No.: 189,432

[22] Filed: Jan. 31, 1994

Related U.S. Application Data

[63] Continuation-in-part of Ser. No. 948,037, Sep. 21, 1992, abandoned.

[51] Int. Cl.5 .................. F16K 43/00; F16L 41/06
[52] U.S. Cl. .................. 137/318; 222/83; 408/97
[58] Field of Search .......... 137/15, 318; 138/97, 138/99; 222/5, 81, 83, 83.5; 408/97, 115 B, 115 R

[56] References Cited

U.S. PATENT DOCUMENTS

| | | | |
|---|---|---|---|
| 444,235 | 1/1891 | McHugh | 285/197 |
| 915,230 | 3/1909 | Sinclair et al. | 285/198 |
| 1,812,907 | 7/1931 | Tell | 408/97 |
| 2,392,059 | 1/1946 | O'Neil | 137/318 |
| 2,418,234 | 4/1947 | McCullough | 408/97 |
| 2,418,956 | 4/1947 | Silver | 408/97 |
| 3,068,726 | 12/1962 | Vernooy | 137/318 |
| 3,115,889 | 12/1963 | Franck et al. | 137/318 |
| 3,171,419 | 3/1965 | Black | 137/15 |
| 3,395,724 | 8/1968 | Hamel | 137/318 |
| 3,547,144 | 12/1970 | Mullins | 137/318 |
| 3,548,861 | 12/1970 | Mullins | 137/318 |
| 3,648,725 | 5/1972 | Strybel | 137/318 |
| 3,698,419 | 10/1972 | Tura | 137/318 |
| 4,157,195 | 6/1979 | Costanzo et al. | 285/198 |
| 4,342,338 | 8/1982 | Glennie | 138/99 |
| 4,955,406 | 9/1990 | Antoniello | 137/318 |

FOREIGN PATENT DOCUMENTS

| | | | |
|---|---|---|---|
| 426430 | 6/1967 | Switzerland | 408/97 |

*Primary Examiner*—George L. Walton
*Attorney, Agent, or Firm*—Haugen and Nikolai

[57] ABSTRACT

The disclosure is directed to a self-contained line tapping and clamping device for removing fluids from a refrigeration system. The apparatus includes a main inner shaft, and an outer tubular shaft slidably fitting over at least a portion of the inner shaft. A pair of opposing clamp arms are provided; one carried by the lower portion of the inner shaft and the other carried by the outer shaft. The clamp arms align by relative movement of the inner and outer shafts. One of the clamp arms carries a piercing device which includes a piercing point for piercing a line supported by the other clamping arm such that the piercing point is aimed directly at the line. A threaded actuating device including a mechanism for rotating the actuating device is provided for urging the two arms together as they move relative to each other to thereby cause the piercing point to pierce the line.

21 Claims, 2 Drawing Sheets

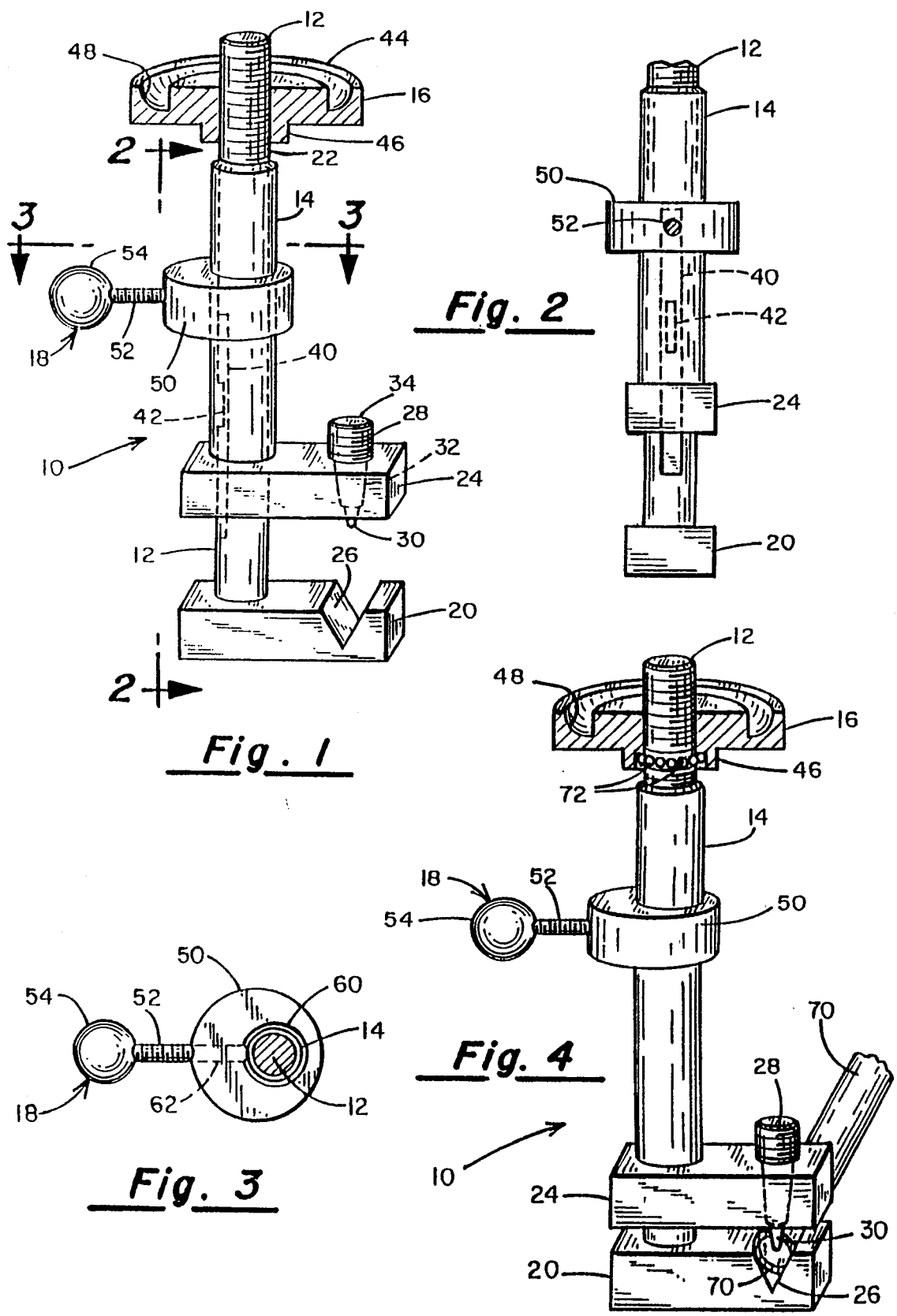

LINE TAPPING AND CLAMPING ASSEMBLY FOR REFRIGERATION SYSTEMS

CROSS-REFERENCE TO RELATED APPLICATION

This is a continuation-in-part of application Ser. No. 07/948,037, filed Sep. 21, 1992, now abandoned.

BACKGROUND OF THE INVENTION

I. Field of the Invention

This invention relates generally to line tapping and clamping devices and more particularly to a line tapping and clamping device for piercing a line of a refrigeration system to alter the level of the coolant contained therein.

II. Discussion of the Prior Art

A combination line tapping and clamping device must be small and adjustable to be used in the confined areas found in modern, compact refrigeration and air conditioning systems. The function of a line tapping and clamping device is to tap a tube or main line and tightly clamp a temporary branch or auxiliary line to the tube so high pressure fluid, such as freon, can be siphoned off or added without leakage. This prevents dangerous fluids from leaking into the atmosphere. Many line tapping and clamping devices, previously built, were incapable of simultaneously piercing a main line and clamping a branch line to the main line. These devices were also not built for use in the confined areas commonly found in modern refrigeration systems.

Simple clamping devices for coupling a branch line to a main line are well known in the prior art. These clamps are variations on a C-clamp having one arm fitting around the outside of a main line or tube and a second arm providing a seal and hole that aligns with a predetermined hole in the main line. Examples of this type of clamp can be found in U.S. Pat. Nos. 444,235, 915,230 and 4,157,195. In each of these patents, the hole extending through the wall of the main line must be present before the clamp is used to connect a branch line to the main line. No element for piercing the wall of the main line is present.

A simple line tapping device, described in U.S. Pat. No. 2,392,059, issued to O'Neil, is a C-clamp shaped device wherein the line of interest is cradled in one arm of the C-clamp and a threaded shaft, having a bit at one end, is threaded through the other arm of the C-clamp perpendicular to the line of interest. The threaded shaft is rotated to screw the bit through the line. The focus of the '059 patent is the ability of the device to tap the line and direct the fluid or gas flow down, in a controlled manner. Once the hole is made through the line and the bit is removed, the fluid or gas contained therein is free to flow out of the line through the hole. The device in the '059 patent is not designed to clamp a branch line to the main line and guide the fluid or gas in the line through a hose or branch line. Of course, the bit described in the '059 patent is solid and does not permit fluid or gas to flow through it. The device described in the '059 patent also does not have an adjustable handle for manipulating or moving the line tapping device into a confined area and holding the tapping device firmly while torque is applied for drilling the hole.

Devices incorporating the ability to clamp a line or pipe and pierce the pipe are described in U.S. Pat. Nos. 3,115,889, 3,547,144 and 3,648,725. Each of these patents disclose a clamp for securely clamping a valve to a section of conduit or pipe. Incorporated into each clamp and valve assembly is a needle or tapered hollow tube that can be forced through the wall of the pipe being clamped. Wrenches and screw drivers are used to securely fasten each clamp to the main pipe and to force the needle through the pipe. The problem with using these devices on a refrigeration system is apparent from the means used for clamping them to the main pipe and the means used for forcing the needle or tapered hollow tube through the wall of the pipe. The permanent nature of the fixtures once attached and the inability of the devices to be easily installed in a confined area make them cumbersome to use.

A device with problems similar to these is described in U.S. Pat. No. 1,812,907, issued to one William Tell. The device described in Tell is first clamped around a pipe, which requires the use of an auxiliary tool for rotating a bolt. A drill bit is then rotated to drill a hole in the pipe. Rotation of the drill bit also requires using an auxiliary tool. Finally, after the hole is tapped, the hollow drill bit is secured in place with a threaded sleeve. An auxiliary tool is also used to turn the threaded sleeve. Use of an auxiliary tool in a confined area is very cumbersome at best. If the Tell device is used to tap a pipe, an auxiliary tool must be used three times.

In contrast, the present invention is self-contained, in that no auxiliary tools are required to pierce a tube or pipe and secure a hollow needle to the pierced tube. Instead, a hand rotated disk member is provided for forcing a hollow needle through the tube or line of interest. The hole is not drilled but pierced in the line of interest. At essentially the same time as the piercing occurs, the line of interest is clamped in place and the hollow needle is secured to the line. This requires one motion and no extra tools, as opposed to three motions and three extra tools if the device described in Tell is used.

Other tools developed for overcoming the problem of working in a confined area include vice grip style devices. Using these devices, as shown in U.S. Pat. Nos. 3,395,724 and 3,698,419, a pipe is pierced either as the vice grips close or by squeezing a third handle having a bit. One problem with these devices is the inability to adjust the vice grips handles in relation to the direction of the pipe being tapped. In a confined area, it is possible that the pipe will be in such a position that the handles of the vice grips will not allow the jaws to be securely clamped around the pipe. Also, if a thick walled pipe is encountered, the user may not be able to apply enough force to pierce the pipe with these devices. The force that can be applied on the jaws of the vice grips is limited by the lever arm of the vice grip handles and the force applied by squeezing the handles. This force may be further limited by the inability to get one or both hands into the confined area. To improve upon these devices, the present invention uses an adjustable handle and a rotatable threaded member or forcing means including a disk member.

By adjusting the handle, the present invention can be made to fit into a confined area. Further, by using the threaded member or forcing means to apply force while holding the adjustable handle, a large amount of force can be applied to the piercing element to pierce the line of interest. The present invention also has a slidable hollow outer shaft to allow the clamp arms to be easily opened to fit around a variety of pipe sizes.

Other devices having easily opened clamp arms include drill jigs as described in U.S. Pat. No. 2,418,234, issued to McCullough and shown in Swiss Patent No. 426,430, disclosed by Homberger. These devices have two clamp arms that secure a piece of material, such as a pipe, in place for having a hole drilled in it. The drill bit and mechanism for turning the drill bit are separate devices that must be provided to tap a hole in the clamped material. No hand rotatable threaded member or forcing means including a disk member for forcing a needle through a pipe and simultaneously clamping the material in place is shown in these disclosures.

One other reference of interest is U.S. Pat. No. 4,342,338, issued to Glennie, which discloses a sealing boot for repairing a ruptured main and an application tool for applying the boot to the ruptured main. The application tool comprises upper and lower clamp jaws attached to upper and lower stems, a crank with a handle grip and a threaded shaft. The jaws extend perpendicularly from their respective stems and lie in face to face relation with one another. The jaws are maintained in such relation by the square shape of the lower stem slidably inserted into the square shaped bottom of the upper stem. The threaded shaft is mated through the threaded inner core of the top portion of the upper stem to the top end of the lower stem. The crank and hand grip are rotatably connected to the top end of the threaded shaft.

In operation, the operator grips the handle and rotates the crank. As the crank is rotated, the lower stem is moved upwardly or downwardly relative to the upper stem so that the upper and lower jaws are opened or closed. The device described in the '338 patent does not have a piercing element or an adjustable handle for using the device in a confined area.

From the above, it can be seen that the references of the related art, of which the present applicants are aware, individually and as a whole, fail to disclose a clamping assembly for simultaneously piercing and clamping a line of interest wherein the clamping assembly has a threaded member for applying a large amount of force to the piercing element, a slidable tube member for easily inserting the device around the pipe to be tapped, or an adjustable handle for maneuvering and holding the device.

SUMMARY OF THE INVENTION

The present invention is directed to a line tapping and clamping device for piercing a line of a refrigeration system. The device in one embodiment comprises an inner central main shaft, preferably made of steel, having threads at one end, the upper portion, and carrying a first or cradling clamp arm at the other end, the lower portion. The first clamp arm has a transverse V-groove in it for cradling the line to be tapped. An hollow outer tubular shaft, carrying a second or puncturing clamp arm, slidably fits over the inner main shaft. The second clamp arm is held in face-to-face relation with the first clamp arm. The second clamp arm carries a hollow tubular needle that extends into the transverse V-groove of the first clamp arm. The hollow tubular needle is for piercing the line to be tapped.

In general, to pierce a tube or main line, a threaded operating disk member is rotated onto the threads of the main shaft after the outer tubular shaft has been fitted over the inner main shaft. Rotating the disk member in one direction causes the disk member to contact the outer tubular shaft and force the second clamp arm toward the first clamp arm. The clamp arms act like jaws to secure the line of interest in place. This is the screw actuated clamping means of the first embodiment. The hollow tubular needle in the second clamp arm simultaneously pierces the main line or line of interest to be tapped, situated in the transverse V-groove of the first clamp arm. The hollow tubular needle has an auxiliary or branch line attached to it which is clamped to the main line. To release the device from the main line, the disk member is rotated in the opposite direction.

An alternative embodiment has a central steel, two piece inner main shaft including a first piece or lower portion that has a threaded hole or bore along its central axis at one end and carrying the first line cradling clamp arm at the other end. The second piece or upper portion is a steel threaded shaft having threads at one end and carrying a disk member or manual rotation means securely attached to the other end.

In operation, the hollow outer shaft slidably fits over the first piece or lower portion of the two piece inner shaft. The second piece or upper portion of the two piece inner shaft is then inserted into the outer shaft and turned to threadably engage the threaded bore in the first piece. This is accomplished by turning the manual rotation means attached to the second piece. Rotating the disk member threads the second piece into the first piece and acts as a threaded forcing means. This pulls the first clamp arm toward the second clamp arm, which is caught between the two pieces of the inner shaft. A main line cradled in the transverse V-groove of the first clamp arm is instantly pierced by the hollow needle carried in the second clamp arm. Simultaneously, this temporarily clamps a branch line to the main line. To release the device from the main line, the manual rotation means or disk member and second piece of the inner main shaft are rotated in the opposite direction.

An adjustable handle is provided for each embodiment. The handle may be adjusted to enable the operator to maneuver the device into a confined area. The handle may be secured to the outer shaft. Once secured, the handle may be used for holding the device while the operator applies torque to the disk member. The adjustable handle comprises a knob firmly attached to a threaded shaft. The adjustable handle further comprises a collar or cylindrical clamp member. The cylindrical clamp member has a central hole along its central axis. The central hole is large enough for the outer shaft to slide through. The collar further has a threaded hole, perpendicular to the central hole. The threaded hole extends from the outside wall of the cylindrical clamp member to the central hole. The threaded hole is large enough to rotatably receive the handle's threaded shaft.

In operation, the handle's threaded shaft acts as a set screw for the collar. The cylindrical clamp, shaft and knob assembly is positioned on the outer tubular shaft member and may be pivoted and slid up or down on the outer shaft to situate it as desired. Torque is then applied to the knob to rotate the handle's threaded shaft through the cylindrical clamp member's threaded hole. Eventually, by turning the knob enough times, the handle's threaded shaft engages the outer shaft and clamps the adjustable handle into place. The line tapping and clamping device may then be moved over the main line to be tapped. Once the clamp arms are around the main line or line of interest, the adjustable handle is grasped and the disk member is torqued to pierce the line and clamp a branch line to it.

It is accordingly a principle object of the invention to provide a self-contained line tapping or piercing and clamping device.

Another object of the invention is to provide an improved line tapping and clamping device for use on modern refrigeration and air conditioning systems.

Yet another object of the invention is to provide an improved line tapping and clamping device that needs no auxiliary tools for applying enough force to pierce a main line and temporarily clamp a branch line to the main line.

Yet another object of the invention is to provide an improved line tapping and clamping device having an adjustable handle for using the device in confined areas and grasping while torque is applied to a manual rotation means.

The foregoing features and advantages of the present invention are attained in a first embodiment by providing a self-contained line tapping and clamping device having an inner main shaft with a first clamp arm firmly attached to one end, the lower portion, and threads at the other end, the upper portion. The first clamp arm extends perpendicular to the main shaft and has a transverse V-groove into which the line to be pierced is situated. When the line is situated in the transverse groove, it lies perpendicular to the main shaft and the first clamp arm. An hollow outer tubular shaft having a second clamp arm firmly attached to one end, slidably fits over the main shaft. In this position, the clamp arms or jaws may be put into close face-to-face registration with one another. A hollow tubular needle for piercing a main line is attached to the second clamp arm, parallel to the main shaft and the outer tubular shaft. The point of the tubular needle faces the transverse V-groove of the first clamp arm. The needle has a threaded portion, above the second clamp arm, to which a hose can be attached for directing gas or fluid away from the tapped tube.

The outer tubular shaft is prevented from rotating on the main shaft by a tab firmly attached to the inside of the outer tubular shaft. The tab slidably fits into a slot formed in the main shaft. This maintains the first and second clamp arms in face-to-face registration.

When assembled, the threads of the inner main shaft protrude from the outer tubular shaft situated over the main shaft. A threaded disk member acts as the manual rotation means and is rotated onto these threads. As the threaded disk member is rotated onto the main shaft, the threaded portion of the main shaft protrudes through the threaded disk member. The threaded disk member has one large diameter portion for grasping and turning by hand and a second small diameter portion having a diameter equal to or slightly larger than the outside diameter of the outer tubular shaft. The small diameter portion extends from the large diameter portion to contact the top of the outer tubular shaft. Thus, when the disk member is rotated in one direction, the small diameter portion contacts the outer tubular shaft and forces the second clamp arm toward the first clamp arm, acting as a threaded forcing means.

To make the threaded disk member easier to turn when it is in contact with the outer tubular shaft, a recessed thrust bearing may be added to the second small portion of the disk member. The thrust bearing is situated in the second small portion to contact the outer tubular shaft and act as a bearing between the threaded disk member and the outer tubular shaft.

In a second embodiment, the inner main shaft of the first embodiment is replaced with a two piece shaft combination. The first piece or lower portion is an hexagonal, preferably steel, shaft having a threaded shaft hole running along the main axis of the shaft beginning at one end and extending into the shaft. A first cradling clamp arm is firmly attached, perpendicular, to the hexagonal shaft at the other end. A transverse V-groove in the first cradling clamp arm is preferably perpendicular to the first clamp arm and the hexagonal shaft. The second piece or upper portion of the inner main shaft is a threaded shaft, threaded on the outside, and preferably made out of steel. A disk member for manual rotation is firmly attached to the externally threaded shaft at one end. At the other end, the externally threaded shaft has threads which mate with the threaded hole of the hexagonal shaft. Turning the disk member rotates the threaded shaft into the hexagonal shaft when the two pieces are aligned.

The hollow outer shaft of the second embodiment generally has a tubular body with an inside diameter that fits over the hexagonal shaft. Firmly attached to one end of the outer shaft is a second puncturing clamp arm carrying a tubular needle for piercing a tube. At this end of the outer shaft is an hexagonal hole axially aligned with the tubular body. The hexagonal hole mates with the hexagonal shaft when the outer shaft is slid over the hexagonal shaft. The flat portions of the hexagonal parts prevent the hexagonal shaft from rotating in the outer shaft. Thus, the first clamp arm and second clamp arm are maintained in alignment by the hexagonal key.

The threaded shaft, of the two piece main shaft, is rotated into the threaded hole in the hexagonal shaft after the hexagonal shaft has been inserted into the outer shaft. The threaded shaft is threaded into the hexagonal shaft by rotating the attached disk member. This disk member has one large diameter portion and another small diameter portion. The large diameter portion is large enough to grasp and torque. The small diameter portion extends from the large diameter portion and is slightly larger in diameter than the outer shaft. The small diameter portion contacts the outer shaft as the disk member and threaded shaft are rotated into the hexagonal shaft. This threaded forcing means forces the outer shaft and second clamp arm toward the first clamp arm. If a tube or line of interest is cradled in the transverse V-groove, the line will be pierced as the tubular needle in the second clamp arm is forced toward the first clamp arm. Simultaneously, the main line is clamped between the two clamp arms or jaws and to a temporary branch line for draining off fluid or gas.

To make the disk member easier to turn when it contacts the outer shaft, a recessed thrust bearing is added to the small portion of the disk member. The thrust bearing contacts the outer shaft and acts as a bearing to make turning the disk member easier. The disk member is turned the opposite direction to release the device from the main line.

An adjustable handle is provided for each embodiment to adjust the contours of the device for maneuvering it into confined areas. As is obvious from the figures, the adjustable handle is also for grasping when torquing the disk member to pierce a line. The adjustable handle comprises a cylindrical or circular clamp member having a first central hole along its central axis. The first central hole is large enough for the outer shaft to slide through. The cylindrical clamp member has a second hole perpendicular to the first hole and threaded. The second hole extends from the outside of the cylindrical clamp member to the first central hole. A threaded shaft having a knob firmly attached to one end is rotated into the second hole of the cylindrical clamp member and acts as a set screw. The cylindrical clamp member, knob and threaded shaft assembly is slid onto the outer tubular shaft and the knob is torqued to turn the threaded shaft of the adjustable handle into the second hole of the cylindrical clamp member. The handle's threaded shaft eventually engages the outer shaft. The knob is then torqued to clamp the handle firmly in place on the outer shaft.

In operation, the device is fitted into a confined area of a refrigeration system by first turning the adjustable handle knob to loosen the adjustable handle on the outer shaft. The handle is then pivoted and slid up or down on the outer shaft until the transverse groove of the first clamp arm can be situated onto the line to be pierced. When the handle is properly situated, both longitudinally and pivotally on the outer shaft, the knob of the handle is rotated to secure the adjustable handle in place. The first and second clamp arms are then situated around the pipe to be tapped and with one hand holding the knob of the handle, the other hand rotates the disk member to pierce the main line and secure the branch line to the main line. The disk member is torqued to force the hollow tubular needle through the wall of the line being tapped and to snugly clamp the hollow needle into the line. In this manner, fluid or gas can be removed from a system.

Other objects, features and advantages of the present invention will become apparent to those skilled in the art through the description of the preferred embodiments, claims, and drawings herein.

BRIEF DESCRIPTION OF THE DRAWINGS

FIG. 1 is a side elevation of the one embodiment of the line tapping and clamping assembly with the threaded disk member shown in a vertical section and hidden portions shown with dotted lines;

FIG. 2 is a back side elevation taken substantially along the line 2—2 of FIG. 1 showing the tab of the outer tubular shaft and the slot of the main shaft in dotted lines, excluding the knob of the adjustable handle and the threaded disk member;

FIG. 3 is a horizontal section taken substantially along the line 3—3 of FIG. 1 showing the components of the adjustable handle, and the main shaft slidably fit into the outer tubular shaft which is slidably fit through the hole of the adjustable handle;

FIG. 4 is a side elevation of the first embodiment of the line tapping and clamping assembly, essentially the same as FIG. 1, but showing the assembly piercing and clamping a refrigeration line, shown in crossection;

DESCRIPTION OF THE PREFERRED EMBODIMENT

Figure 5:
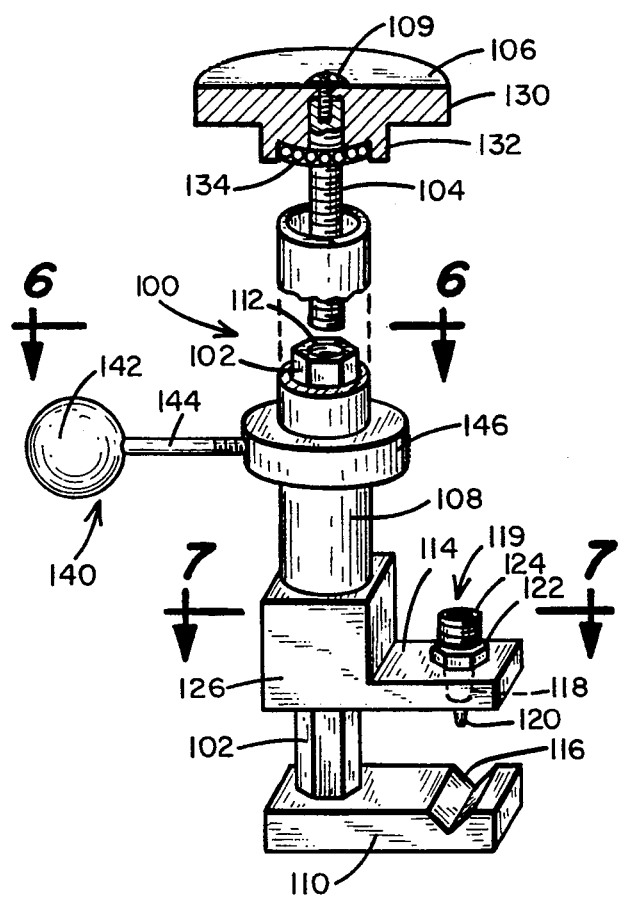
FIG. 5 is a side elevation of another embodiment of the line tapping and clamping assembly with the disk member shown in a vertical section and a cut-away showing the threaded shaft not turned into the hexagonal shaft.

Indicated generally in FIG. 1 is one embodiment of a self-contained line tapping and clamping assembly 10 for tapping the lines of a refrigeration or air conditioning system to alter the level of fluid or gas contained therein. The clamping assembly 10 comprises an inner main shaft 12, an hollow outer tubular shaft 14, a threaded disk member 16 and an adjustable handle, indicated generally by the numeral 18. The inner main shaft 12 has a first clamp arm 20 firmly attached to one end, the lower portion, such as by welding or a press fit with solder, preferably copper solder. The main shaft 12 has a threaded portion 22 at the other end, the upper portion. The outer tubular shaft 14 has a second clamp arm 24 firmly attached to one end, such as by welding or by a press fit and solder. The hollow outer tubular shaft 14 has an inner diameter which is larger than the outer diameter of the main shaft 12. Thus, the outer tubular shaft 14 can slidably fit over the main shaft 12, including the threaded portion 22. The outer tubular shaft 14 is positioned over the main shaft 12 so the first clamp arm 20 and the second clamp arm 24 may be in close face-to-face registration with each other. The threaded portion 22 of the main shaft 12 protrudes out of one end of the outer tubular shaft 14, opposite the two clamp arms or jaws 20 and 24.

The threaded disk member 16 is rotated onto the threaded portion 22 of the main shaft 12 protruding out of the outer tubular shaft 14. Turning the threaded disk member 16 clockwise causes the disk member 16 to contact the outer tubular shaft 14. Further torquing the disk member 16 forces the second clamp arm 24 toward the first clamp arm 20. As described below, this pierces a main line or tube and at least temporarily clamps a branch line to the main line.

As is obvious from the Figures, the adjustable handle 18, described in detail below, is for holding the device while applying torque to the threaded disk member 16. This prevents the main line of interest from being bent when torque is applied to the threaded disk member 16. The adjustable handle 18 slides and pivots on the outer tubular shaft 14 before being temporarily secured to the outer tubular shaft 14. The adjustable handle 18 is secured to the outer tubular shaft 14 by turning a knob 54 and threaded shaft 52 clockwise. The knob 54 is firmly attached to the threaded shaft 52. Turning the knob 54 rotates the threaded shaft 52 into a collar or cylindrical clamp member 50 and against the outer tubular shaft 14 to act as a set screw and secure the adjustable handle 18 in place. In general, the main shaft 12, the outer tubular shaft 14, the two clamp arms or jaws 20 and 24, and the adjustable handle 18 are made out of steel. The knob 54, however, is molded out of plastic and the threaded disk member 16 is made out of aluminum.

A transverse V-groove 26 for cradling the main line is provided in the first clamp arm 20. A line or pipe situated in the V-groove 26 is perpendicular to the main shaft 12 and the first clamp arm 20. The second clamp arm 24 has a threaded hole having an axis parallel to the main shaft 12 and the outer tubular shaft 14. A hollow tubular needle 28 is turned into the threaded hole in the second clamp arm 24. The hollow tubular needle 28 has a tapered needle point 30 that protrudes out of the second clamp arm 24 and faces the V-groove 26 in the first clamp arm 20. The hollow tubular needle 28 has a threaded small diameter portion 32 which is turned into the second clamp arm 24 and a larger diameter portion 34 which does not extend into the second clamp arm 24. The larger diameter portion 34 has threads on it to accommodate a branch line or hose for fluid or gas to pass through.

As shown in FIGS. 1 and 2, the main shaft 12 has a slot 40. A tab 42 is attached to the inside of the outer tubular shaft 14 by welding or other similar means. The tab 42 slidably fits into the slot 40 in the main shaft 12. The tab 42 and slot 40 prevent the outer tubular shaft 14 from rotating on the main shaft 12. This maintains the hollow tubular needle 28 in face to face registration with the V-groove 26 in the first clamp arm 20. Therefore, when a main line of interest is placed in the V-groove 26 and force is applied to the outer tubular shaft 14 by rotating the threaded disk member 16, the tapered needle point 30 pierces the wall of the main line. The main line is simultaneously pierced and clamped between the first clamp arm 20 and the second clamp arm 24.

The threaded disk member 16 is a piece of material such as steel or aluminum having a large diameter portion 44 and a small diameter portion 46. The large diameter portion 44 and the small diameter portion 46 have a common threaded hole running through the central axis of the threaded disk member 16. The threads in the hole match the threads on the threaded portion 22 of the main shaft 12. This is so the disk member 16 can be rotated onto the threaded portion 22 of the main shaft 12. To pierce a main line, the threaded disk member 16 is rotated onto the main shaft 12 until the small diameter portion 46 contacts the outer tubular shaft 14. The small diameter portion 46 and the outer tubular shaft 14 have essentially equal outside diameters. The large diameter portion 44 is large enough to be easily gripped and turned by hand and, as shown in FIG. 1, the large diameter portion 44 has a hollowed out inner diameter defined by disk wall 48. Rotating the disk member 16 clockwise, as viewed from the hollow side, threads the disk member 16 onto the main shaft 12 acts as a threaded forcing means to push the outer tubular shaft 14 and second clamp arm 24 toward the first clamp arm 20. Rotating the disk member 16 counterclockwise, as viewed from the hollow side, threads the disk member 16 off of the main shaft 12 and allows the outer tubular shaft 14 to be slid away from the first clamp arm 20. In this manner, the line to be tapped can be pierced, clamped and subsequently released.

To make the threaded disk member 16 easier to turn when it is in contact with the outer tubular shaft and being rotated to pierce and clamp a line, a recessed thrust bearing 72, FIG. 4, may be added to the small diameter portion 46. The thrust bearing 72 is situated in the small diameter portion 46 and contacts the outer tubular shaft 14. The thrust bearing 72 acts as a bearing between the threaded disk member 16 and the outer tubular shaft 14.

The adjustable handle 18, for holding the line tapping and clamping assembly 10, can be adjusted both pivotally and longitudinally along the outer tubular shaft 14. The adjustability of the handle 18 allows an operator to arrange the adjustable handle 18 on the line tapping and clamping assembly 10 in a variety of positions for use in a variety of confined areas. As is obvious from the Figures, the adjustable handle 18 may be used for grabbing onto while torquing the threaded disk member 16. As shown in FIG. 3, the adjustable handle 18 comprises a cylindrical or circular collar or clamp member 50, a threaded shaft 52 and a knob 54. The knob 54 is firmly attached to the threaded shaft 52 and preferably made from a hard plastic, wood or similar material. The cylindrical clamp member 50 is cylindrical in shape having two flat ends. The clamp member 50 has a large hole 60 in the center or to one side of its central axis. The large hole 60 extends from one end of the clamp member 50 to the other end. The diameter of the large hole 60 is greater than the outside diameter of the outer tubular shaft 14. In use, the cylindrical clamp member 50 is slid over the outer tubular shaft 14 and the threaded shaft 52 is turned into a threaded hole 62 in the clamp member 50, by rotating the knob 54. The threaded hole 62 in the clamp member 50 extends from the outside of the clamp member 50 to the large hole 60 and is perpendicular to the large hole 60. By rotating the knob 54 in a clockwise direction, as seen from the side of the knob, the threaded shaft 52 is turned into the threaded hole 62. Rotating the threaded shaft 52 into the threaded hole 62 causes the threaded shaft 52 to eventually engage the outer tubular shaft 14. Torquing the knob 54 secures the adjustable handle 18 to the outer tubular shaft 14, thus acting like a set screw for the handle 18. With the adjustable handle 18 securely fastened to the outer tubular shaft 14, the clamping assembly 10 can be moved onto a main line and the threaded disk member 16 torqued to pierce the line and clamp a branch line to the main line.

As shown in FIG. 4, when a main line 70 is situated in the V-groove 26 of the first clamp arm 20 and the threaded disk member 16 is turned onto the main shaft 12, the threaded disk member 16 contacts the outer tubular shaft 14. The outer tubular shaft 14 and second clamp arm 24 are forced toward the first clamp arm 20. The tapered needle point 30 pierces the line 70 with continued torquing of the threaded disk member 16. To seal the connection made between the line 70 and the hollow tubular needle 28, a rubber washer, available at any hardware store, may be situated around the needle point 30. Fluid or gas is added or removed through the hollow tubular needle 28 and an external hose (not shown).

The adjustable handle 18 will move with the outer tubular shaft 14 if it has been secured to the outer tubular shaft 14. If this is not desired, the knob 54 may be rotated to release the adjustable handle 18 from the outer tubular shaft 14 and allow the adjustable handle 18 to freely slide and pivot on the outer tubular shaft 14. This may make it easier to move the line tapping and clamping assembly 10 in a confined area.

Indicated generally in FIG. 5 is a second embodiment of a self-contained line tapping and clamping assembly 100. The second embodiment 100 comprises a lower portion hexagonal shaft 102, an upper portion threaded shaft 104, a disk member 106, and an hollow outer shaft 108. The hexagonal shaft 102 has a first clamp arm 110 firmly attached to one end, such as by welding or press fitting with solder, preferably copper solder. The hexagonal shaft 102 has a threaded hole 112 bored into the other end along its central axis. The outer shaft of the second embodiment 108 has a square base portion 126, including a second clamp arm 114, firmly attached to one end, such as by welding or press fitting and solder. The outer shaft 108 is tubular along its length from the square base portion 126 to the other end. The inner diameter of this tubular portion of the hollow outer shaft 108 is larger than the outer diameter of the hexagonal shaft 102. Therefore, this portion of the outer shaft 108 easily slides over the hexagonal shaft 102. The square base portion 126 has a central bore aligned with the tubular outer shaft 108 but hexagonal in shape. This hexagonal bore of the square base portion 126 matches and slidably fits over the hexagonal shaft 102 to prevent the shaft 108 from turning relative to the hexagonal shaft 102. This maintains the first clamp arm 110 and the second clamp arm 114 in face-to-face registration.

The upper end of the threaded shaft 104 is firmly attached to the disk member 106 as by a screw 109 and is provided with external threads along its length. Rotation of the disk member 106 causes the threaded shaft 104 to rotate in the same direction. The threads on the threaded shaft 104 fit and mesh with the threads in the threaded bore 112 of the hexagonal shaft 102.

In operation, the second embodiment 100 may be assembled by sliding the outer shaft 108 and square base portion 126 over the hexagonal shaft 102 so the first cradling clamp arm 110 and the second puncturing clamp arm 114 are in face-to-face registration. Next, the threaded shaft 104 is stuck into the tubular end of the outer shaft 108 and threaded into the threaded bore 112 of the hexagonal shaft 102. This is the threaded forcing means. Rotating the disk member 106 turns the threaded shaft 104 into the threaded bore 112 and reduces the distance between the disk member 106 and the first cradling clamp arm 110. Eventually, by continuing to turn the disk member 106, the disk member 106 contacts the tubular portion of the outer shaft 108. Torquing the disk member 106 further forces the outer shaft 108 and the second puncturing clamp arm 114 toward the first cradling clamp arm 110.

As shown in FIG. 5, the first clamp arm 110 is perpendicular to the hexagonal shaft 102 and has a V-groove 116 formed in it which is perpendicular to the hexagonal shaft 102 and the first clamp arm 110. As further shown in FIG. 5, the second puncturing clamp arm 114 is perpendicular to the outer shaft 108. Bored into the second clamp arm 114 is a threaded hole 118. A tubular needle member, indicated generally by the numeral 119, is turned into the threaded hole 118 in the second clamp arm 114. The tubular needle 119 has threads (not shown) that match the threads in the threaded hole 118. The tubular needle 119 has a hexagonal nut 122 for turning the tubular needle 119 into the threaded hole 118. By turning the hexagonal nut 122 snugly against one side of the second clamp arm 114, the tubular needle 119 is secured into the second puncturing clamp arm 114. When secured in this position, the point 120 of the tubular needle 119 protrudes out of the second puncturing clamp arm 114 opposite the hexagonal nut 122. The point 120 of the tubular needle 119 is also tubular and penetrates the wall of the main line or tube being tapped. Attached to the hexagonal nut 122 and part of the tubular needle 119 is a threaded connector 124. A hose or a pipe is connected to the threaded connector 124 to act as a branch line for draining off or supplying fluid to the tapped main line.

Figure 7:
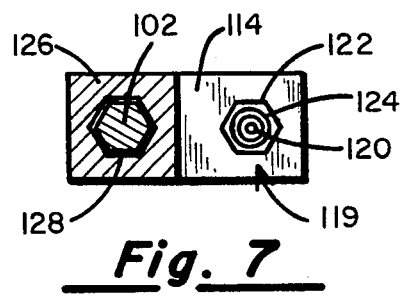
FIG. 7 is a horizontal section taken substantially along the line 7—7 of FIG. 5, showing the hexagonal shaft in the hexagonal hole of the lower portion of the outer tubular shaft.

Shown in FIG. 7 is the second puncturing clamp arm 114 and the tubular needle 119. The second clamp arm 114 is attached to the square base portion 126 of the outer shaft 108. The square base portion 126 has a hexagonal bore 128 that slidably fits over the hexagonal shaft 102. Thus, the outer shaft 108 is keyed onto the hexagonal shaft 102. As long as the second clamp arm 114 is initially aligned with the first clamp arm 110, when the outer shaft 108 is slid onto the hexagonal shaft 102, the second clamp arm 114 will be maintained in face-to-face registration with the first clamp arm 110. This aligns the point 120 of the tubular needle 119 with the V-groove 116 in the first clamp arm 110.

The disk member 106 attached to the threaded shaft 104 has an outer diameter portion 130 and an inner diameter portion 132. The outer diameter portion 130 is for grasping by hand and turning. This is how torque is applied to the threaded shaft 104 as it is turned into the threaded bore 112 of the hexagonal shaft 102. Protruding from the outer diameter portion 130, in the direction of the threaded shaft 104, is the inner diameter portion 132. The inner diameter portion 132 is slightly larger in diameter than the outer shaft 108. Also, the inner diameter portion 132 houses a thrust bearing 134. The thrust bearing 134 contacts the top or tubular end of the outer shaft 108 when the threaded shaft 104 is turned into the threaded bore 112. The thrust bearing 134 acts as a bearing between the disk member 106 and the outer shaft 108. This makes it easier for the operator to turn the disk member 106 when applying torque to force the point 120 of the tubular needle 119 through the wall of a main line of interest.

Figure 6:
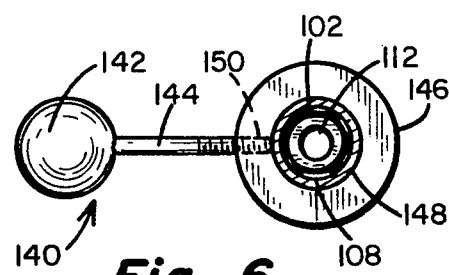
FIG. 6 is a horizontal section taken substantially along the line 6—6 of FIG. 5, showing the components of the adjustable handle, and the hexagonal shaft slidably fit into the outer tubular shaft which is slidably fit through the hole of the adjustable handle.

The second embodiment 100 is also provided with an adjustable handle, indicated generally by the numeral 140 in FIGS. 5 and 6. The adjustable handle 140 comprises a knob 142, a handle shaft 144 and a cylindrical handle clamp member or collar 146. The knob 142 is firmly attached to the threaded handle shaft 144 so that turning the knob 142 turns the shaft 144 in the same direction. The cylindrical handle clamp member 146 has a central bore 148. This central bore 148 is slightly larger than the outer diameter of the outer shaft 108.

As shown in FIG. 6, the outer shaft 108 slides through the central bore 148 of the cylindrical handle clamp member 146. Perpendicular to the central bore 148 and running from the outside of the cylindrical handle clamp member 146 to the central bore 148 is a threaded handle bore 150. The threads in the threaded handle bore 150 mesh with the threads on the threaded handle shaft 144. The threaded handle shaft 144 can be turned into the threaded handle bore 150 until one end of the threaded handle shaft 144 engages the outside of the outer shaft 108. By torquing the knob 142 of the handle 140, the cylindrical handle clamp member 146 is secured against the outer shaft 108 and acts as a set screw for the handle 140. Also shown in FIG. 6, is the outer shaft 108 slidably fitting over the hexagonal shaft 102. The central threaded bore 112 of the hexagonal shaft 102 can also be seen.

Figure 8:
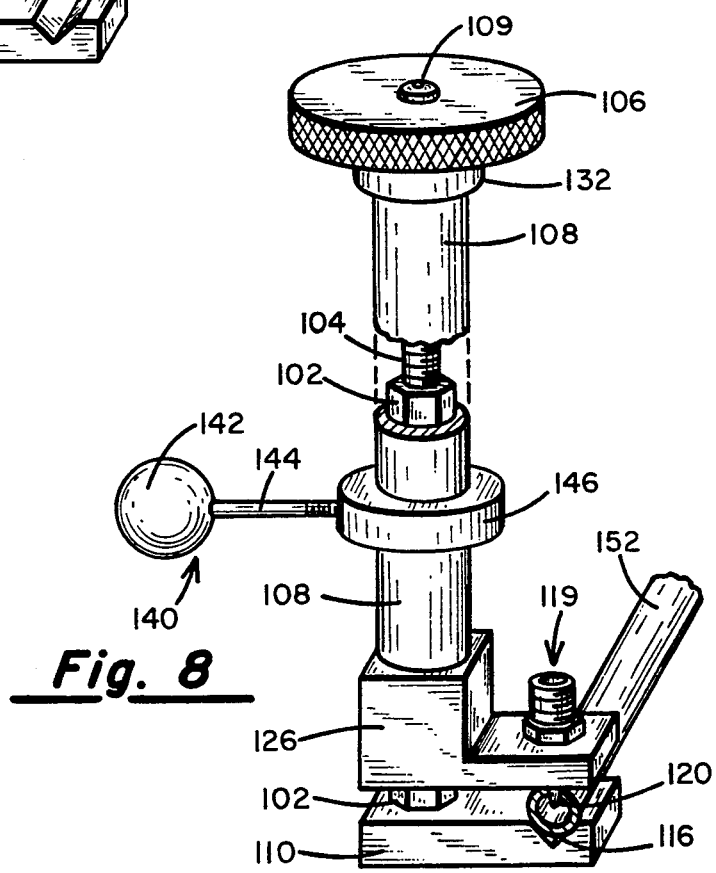
FIG. 8 is a side elevation of the second embodiment of the line tapping and assembly, essentially the same as FIG. 5, but showing the assembly piercing and clamping a refrigeration line, shown in cross-section.

In operation, the outer shaft 108 is slidably fit over the hexagonal shaft 102 so the point 120 of the tubular needle 119 aligns with the V-groove 116 in the first clamp arm 110. The cylindrical handle clamp member 146 may then be put onto the outer shaft 108 through the central bore 148 of the cylindrical handle clamp member 146. The knob 142 and threaded handle shaft 144 are then turned into the threaded bore in the cylindrical handle clamp member 146 and, if desired, the handle 140 is secured in place on the outer shaft 108. Next, the main threaded shaft 104 is slid into the tubular end of the outer shaft 108 and threaded into the threaded bore 112 of the hexagonal shaft 102. Turning the disk member 106 rotates the shaft 104 into the threaded bore 112. Eventually, the inner diameter portion 132 carrying the thrust bearing 134 comes into contact with the outer shaft 108. Turning the disk member 106 further, forces the second clamp arm 114 and the tubular needle 119 toward the first clamp arm 110. As shown in FIG. 8, if a pipe or tube 152 is situated in the V-groove 116 of the first clamp arm 110 and the disk member 106 is torqued against the outer shaft 108, the point 120 of the tubular needle 119 will pierce the wall of the tube 152.

The adjustable handle 140 of the second embodiment 100 is for moving the second embodiment 100 into a confined area with one hand and also for grasping as torque is applied to the disk member 106. To supply maximum torque, the operator may grasp the knob 142 of the adjustable handle 140 after the handle 140 is secured to the outer shaft 108. With the other hand, the operator may apply torque to the disk member 106. This permits the operator to puncture the wall of a tube or pipe 152 having maximum thickness. If the operator cannot get both hands into the confined area, the operator may use one hand to position the second embodiment 100 in place and turn the disk member 106 for puncturing the main line objective. Thus, the present invention will simultaneously pierce a main line and, at least temporarily, clamp a branch line to the main line without the use of any auxiliary tools. Also, the entire procedure, of piercing and clamping, may be performed in basically one motion and with one hand. The device of the present invention can cleanly pierce a tube of interest with an outer diameter of 3/16ths of an inch. The tube of interest may be aluminum, copper, steel or other similar materials.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A self-contained piercing apparatus comprising:
   (a) an inner shaft having an upper portion, a lower portion and a first arm carried on said lower portion;
   (b) an hollow outer shaft slidably fitting over a portion of said inner shaft and carrying a second arm thereon, said first and second arms being capable of alignment by relative movement of said inner and outer shafts;
   (c) piercing means having an end with a piercing point for piercing a line supported by one of said arms, said piercing means being attached to the other of said first and second arms with the piercing point facing in the direction of the one of said arm supporting the line and the line; and
   (d) a threaded actuating means for urging said first and said second arms together as they move relative to each other, said actuating means including means for rotating said threaded actuating means to cause said piercing means to pierce said line.

2. The apparatus of claim 1 wherein said piercing means is hollow.

3. The apparatus of claim 2 wherein said piercing means includes integral connection means for externally connecting a pierced line.

4. The apparatus of claim 3 wherein the piercing means further comprises sealing means to prevent leakage from the tapped hole other than through said connection means.

5. The apparatus of claim 1 further comprising alignment means for maintaining said first and second arms aligned.

6. The apparatus of claim 5 wherein the alignment means comprises said inner shaft having a slot extending from said upper portion toward said first arm, and a tab on the inside of said hollow outer shaft, said tab slidably inserted into said slot of said inner shaft.

7. The apparatus of claim 1 further comprising an infinitely adjustable handle means attachable to said hollow outer shaft for moving and holding said apparatus.

8. The apparatus of claim 1 wherein the inner shaft consists of a single member.

9. The apparatus of claim 1 wherein the inner shaft comprises a first piece having a threaded shaft and a second piece having a threaded bore.

10. An apparatus for piercing and clamping a main line, comprising:
    (a) an inner shaft having a first threaded end and a second end carrying a first arm;
    (b) a hollow outer shaft slidably fitting over a portion of said inner shaft, and carrying a second arm thereon, said first and second arms being capable of alignment by relative movement of said inner and outer shafts;
    (c) a hollow piercing member having an end with a piercing point for piercing a line supported by said first arm, said piercing member being carried by said second arm with the piercing point facing in the direction of the first arm and the line; and
    (d) actuating means, including a threaded member rotatably connected to the threaded end of said inner shaft, for urging said first and second arms together to cause said piercing means to pierce said line.

11. The apparatus of claim 10 further comprising alignment means for keeping said first and second arms aligned.

12. The apparatus of claim 11 wherein the alignment means comprises said inner shaft having a slot extending from the first threaded end toward the second end and a tab on the inside of said hollow outer shaft slidably fit into said slot of said inner shaft.

13. The apparatus of claim 10 further comprising an axially and radially adjustable handle means capable of being carried by said outer shaft for moving and holding said apparatus.

14. The apparatus of claim 10 wherein said piercing member includes integral connection means for externally connecting a pierced line.

15. The apparatus of claim 14 wherein the piercing member further comprises sealing means to prevent leakage from the tapped hole other than through said connection means.

16. An apparatus for piercing a line, comprising:
    (a) a first inner shaft having a threaded bore in one end and carrying a first arm at the other end;

(b) a hollow outer shaft slidably fitting over a portion of said first inner shaft, said outer shaft carrying a second arm thereon, said first and second arms being capable of alignment by relative movement of said first inner shaft in said outer shaft;

(c) a hollow piercing member having an end with a piercing point for piercing a line supported by said first arm, said hollow piercing member being carried by said second arm and facing said first arm and the line; and (d) actuating means including a second threaded inner shaft connected to a rotation means for rotating said second threaded inner shaft into said threaded bore in said first inner shaft, said actuating means urging said first and second arms together to cause said piercing member to pierce said line.

17. The apparatus of claim 16 further comprising alignment means for keeping said first and second arms aligned.

18. The apparatus of claim 17 wherein the alignment means comprises a first flat surface on said first inner shaft and a matching second flat surface in said hollow outer shaft slidably fit over said first inner shaft, said first and second flat surfaces preventing rotation of said hollow outer shaft on said first inner shaft.

19. The apparatus of claim 16 further comprising an axially and radially adjustable handle means attachable to said outer shaft for moving and holding said apparatus.

20. The apparatus of claim 16 wherein said piercing member includes integral connection means for externally connecting a pierced line.

21. The apparatus of claim 20 wherein the piercing member further comprises sealing means to prevent leakage from the tapped hole other than through said connection means.

* * * * *